United States Patent [19]

Brown et al.

[11] Patent Number: 4,488,572

[45] Date of Patent: Dec. 18, 1984

[54] APPARATUS FOR RETAINING A VALVE BODY IN ENGAGEMENT WITH THE VALVE NECK OF A PRESSURIZED CONTAINER

[75] Inventors: Anthony D. Brown, Woodland Hills; Vincent J. Cerrato, Camarillo, both of Calif.

[73] Assignee: Grundy Dispense Systems, Inc., Canoga Park, Calif.

[21] Appl. No.: 514,784

[22] Filed: Jul. 18, 1983

[51] Int. Cl.[3] ........................ F16K 43/00; F16L 37/00; B65D 83/00

[52] U.S. Cl. .................................... 137/315; 137/212; 137/322; 220/316; 220/319; 222/400.7; 285/360

[58] Field of Search ............... 137/315, 212, 320, 321, 137/322; 220/316, 319, 320; 251/149.6, 149.9; 285/360, 376, 401; 222/400.7, 400.8

[56] References Cited

U.S. PATENT DOCUMENTS

| | | | |
|---|---|---|---|
| 4,159,102 | 6/1979 | Fallon et al. | 137/322 |
| 4,181,143 | 1/1980 | Fallon | 137/322 |
| 4,363,336 | 12/1982 | Cerrato | 137/322 |

*Primary Examiner*—George L. Walton
*Attorney, Agent, or Firm*—Thomas I. Rozsa

[57] ABSTRACT

The present invention relates to an improved apparatus for retaining a valve body in secure engagement with the valve neck of a pressurized container. The apparatus assembly of the present invention incorporates a unique design which makes the retaining arrangement tamperproof since the retaining ring or rings which keep the valve body in place within the valve neck cannot be removed through the use of any ordinary tool. It will take a special tool designed especially to remove the retaining ring or rings in order to accomplish the removal process. As a result, product safety is assured with a significant reduction in product liability.

2 Claims, 6 Drawing Figures

Fig. 3.
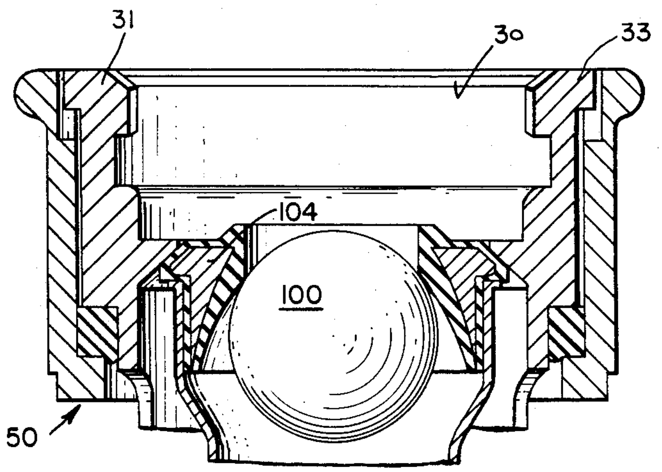
Fig. 4.
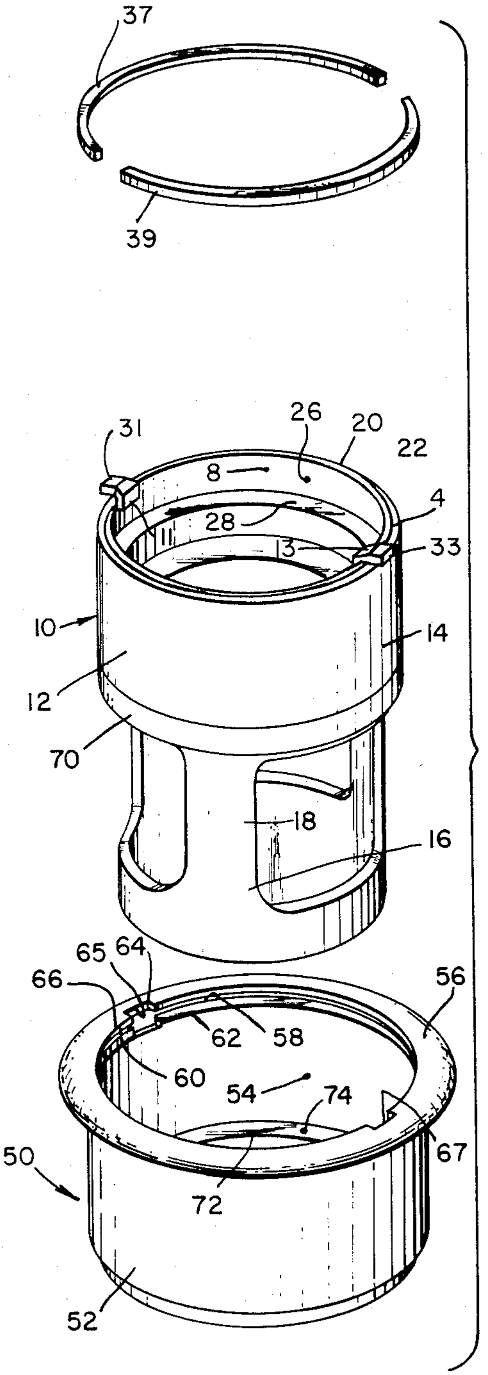
Fig. 5.
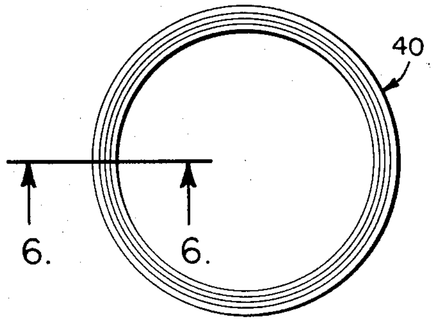
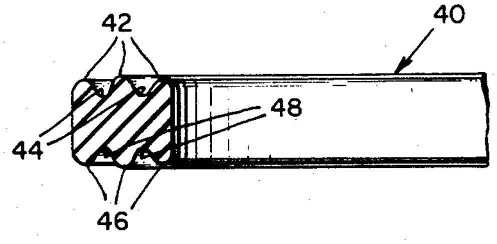
Fig. 6.

APPARATUS FOR RETAINING A VALVE BODY IN ENGAGEMENT WITH THE VALVE NECK OF A PRESSURIZED CONTAINER

BACKGROUND OF THE INVENTION

1. Field of the Invention

The present invention relates to an improved apparatus for retaining a valve body in engagement with the valve neck of a pressurized container. One embodiment in which the present invention is utilized is in conjunction with a valve body which is used to retain a coupling device for tapping a keg of beer which is kept under pressure. In operation, the valve body is inserted by depression into a valve neck which is located at the opening of the container of fluid such as beer. The fluid coupling device is in turn inserted into the valve body by depression and rotation into the valve body. The opening of the container at this location contains a valve neck which is designed to accommodate the valve body and retain it within the neck. Therefore, the coupling device can be securely attached to the valve body so that fluid can be dispensed from the container through the coupler. The field of the present invention relates to the apparatus by which the valve body is effectively retained within the neck portion of the pressurized container.

2. Description of the Prior Art

An apparatus for retaining a valve body with the neck portion of a pressurized container is disclosed in the U.S. Pat. No. 4,181,143 issued to Fallon. The neck portion accommodates the valve body which in turn leads directly to the valve assembly of the container through which fluid is dispensed under pressure from the container into the coupling device and thence out a pouring spout. As shown in U.S. Pat. No. 4,181,143, the top portion of the container neck contains a bushing which has a groove within and extending entirely around the circumference of its inner surface. The groove has an upper and a lower lip which engage the surfaces of a resilient retaining ring which is accommodated within the internal groove of the bushing. The interior portion of the neck further contains a dog legged keyway assembly. The dog legged keyway has a first recessed area which communicates with the top portion of the neck through the upper lip of the groove and further extends to the lower lip. The second offset area forming the dog legged portion communicates with the first recessed area and also extends from the lower lip of the groove to a location below it. The valve body contains a key which is inserted into the first recessed area, then is turned to coincide with the second recessed area and is then depressed so that a retaining ring can be inserted above the valve body and associated key to assure that the key will be kept in place inside the second recessed area. The retaining ring expands to be accommodated within the groove of the bushing in the neck.

While the embodiment disclosed in U.S. Pat. No. 4,181,143 is effective for properly retaining the valve body within the neck, it has a significant disadvantage which could potentially be hazardous to users. The most significant disadvantage of the prior art embodiment is that it permits the retaining apparatus to be tampered with. The retaining ring which is accommodated within the groove and keeps the valve body securely retained within the neck while the container is under pressure, can be removed with a common tool such as a screwdriver. Once the retaining ring is removed, a significant hazard can result from one of two possibilities. Many times, when the valve body is inserted into the valve neck and then turned so that the key on the valve body is aligned with the second recess, a rough or hard turn will cause the key to be broken off. The operator usually doesn't know that the key has been broken off. Once the retaining ring is removed there is nothing left to retain the valve body within the valve housing. Then the pressure within the container could force the valve body to fly out of the neck, thereby potentially seriously injuring someone. Therefore, the embodiment disclosed in the prior art is not tamperproof. While the prior art embodiment is certainly effective under normal use, it does present a serious hazard since it can be easily tampered with.

The present invention significantly modifies the embodiment of the prior art to assure that the valve body is securely retained within the neck of the pressurized container by apparatus means which are tamperproof with common tools. The embodiments of the prior art can be easily tampered with and it is this key element which the present invention addresses.

SUMMARY OF THE PRESENT INVENTION

The present invention relates to an improved apparatus for retaining a valve body in secure engagement with the valve neck of a pressurized container. The apparatus assembly of the present invention incorporates a unique design which makes the retaining arrangement tamperproof since the retaining ring or rings which keep the valve body in place within the valve neck cannot be removed through the use of any ordinary tool. It will take a special tool designed especially to remove the retaining ring or rings in order to accomplish the removal process. As a result, product safety is assured with a significant reduction in product liability.

It has been discovered, according to the present invention, that if a retaining arrangement is designed so that the retaining ring will be in the same plane as the key on the valve body when both are installed within the valve neck of a container, then it will be extremely difficult to remove the retaining ring unless a specially adapted tool is used.

It has also been discovered, according to the present invention, that if a valve body comprising two keys located approximately 180 degrees apart on the valve body is used, the use of two semi-circular retaining rings located in the same plane as the two keys when the valve body and rings are installed within the valve neck of the container will also make it extremely difficult to remove the retaining rings unless a specially adopted tool is used.

It has additionally been discovered, according to the present invention, that in order to assure that the engagement of the valve body to the valve neck is tamperproof with common tools, it is necessary to design the valve body such that its top has a special step which consists of an annular shoulder extending around the entire outer circumference of the top and an internal wall adjacent the shoulder and extending around the entire circumference of the inner periphery of the annular shoulder. Additionally, the retaining ring design should be of sufficient width that a portion of the retaining ring lies within the annular groove of the inner wall of the valve neck and a portion of the retaining ring rests on the top annular shoulder and abuts the inner top wall of the valve body. With this design, it will be virtually impossible to remove the retaining ring unless a special tool specifically adopted for that purpose is used. Therefore, the retaining means is tamperproof with common tools. Additionally, since the key on the valve body is not integral to retaining the valve body within the valve neck, the complete retaining features will be maintained even if the key is accidentally broken off.

Therefore, one object of the present invention is to create a valve body design which incorporates an annular shoulder running along the outer circumference of its top and an annular wall running along the inner periphery of the shoulder, with this valve body design being used in conjunction with one or more retaining rings located partially within the valve neck and resting partially on the annular shoulder, so that the retaining arrangement is tamperproof since through this novel arrangement the retaining ring or rings can only be removed with a specially designed tool.

It is another object of the present invention to provide a retaining means which is independent of the key located on the valve body to therefore assure a firm and secure retaining engagement even if the key on the valve body is accidentally broken off.

It is another object of the present invention to provide a retaining arrangement for a valve body within the valve neck of a container wherein the key located on the outer surface of the valve body is in alignment with and in the same plane as a retaining ring which is located so as to be partially within a groove within the interior valve neck wall and partially on a ledge on the upper surface of the valve body. With this arrangement, it will be extremely difficult to remove the retaining ring without a special tool for this purpose.

It is still another object of the present invention to provide a retaining arrangement for a valve body with the valve neck of a container where the valve body contains two keys located on its outer surface wherein each key is in the same vertical plane and is also in alignment with a pair of approximately semi-circular retaining rings. The pair of retaining rings are located so as to be partially within a groove within the interior valve neck wall and partially on a ledge on the upper surface of the valve body. With this design, it will be extremely difficult to remove the retaining rings without a special tool for this purpose.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation there is illustrated:

FIG. 1 is a cross-sectional view of a complete valve assembly which includes the valve body inserted and retained within the valve neck which is located at the top of a container, through utilization of the present invention.

FIG. 2 is an exploded view of the present invention, illustrating a valve neck containing an internal groove in its upper internal surface with a keyway located within the groove area; a valve body containing a single key on its upper surface and extending outwardly from the surface of the valve body, and a seal located on the valve body and directly beneath its upper cylindrical portion; and a single generally circular split retaining ring.

FIG. 3 is a cross-sectional view of the upper portion of the valve assembly, showing an alternative arrangement of the present invention, with the valve body inserted and retained within the valve neck which is located at the top of a container.

FIG. 4 is an exploded view of an alternative embodiment of the present invention, illustrating a valve neck containing an internal groove in its upper internal surface with a pair of keyways located within the groove area; a valve body containing two keys on its upper surface and extending outwardly from the surface of the valve body; a seal located on the valve body and directly beneath its upper cylindrical portion; and two generally semi-circular retaining rings.

FIG. 5 is a top plan view of the seal which is located on the valve body and directly beneath its upper cylindrical portion.

FIG. 6 is a cross-sectional view of the seal taken along line 6—6 of FIG. 5.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
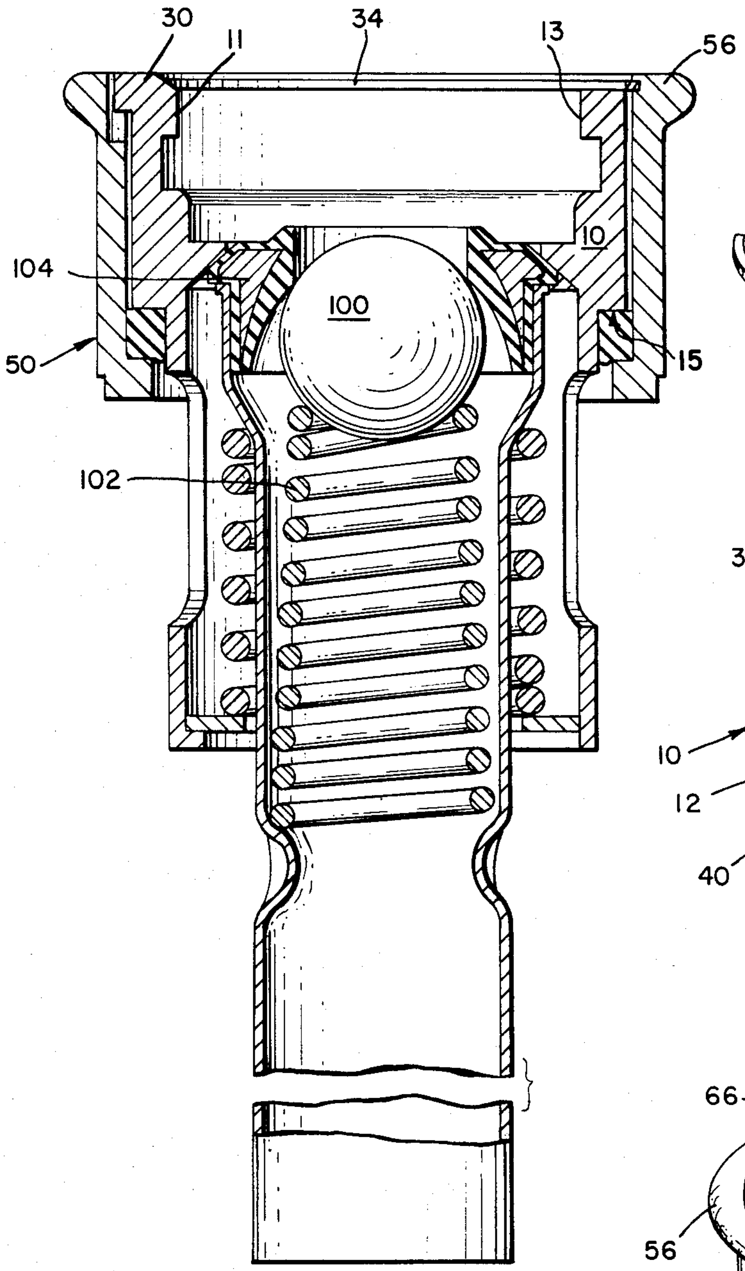

The general valve body and valve neck assembly shown in FIG. 1 is an example of a general arrangement which can be used for pressurized containers such as a keg of beer. The valve neck 50 is welded onto the container (not shown) to form the opening of the container. The valve neck 50 is illustrated in greater detail in FIG. 2. The valve neck 50 is of generally cylindrical configuration with an outer surface 52 and an inner surface 54. The upper portion of the valve neck 50 contains a protruding portion 56. An annular groove 58 extends around the entire inner circumferential wall 54 at a location adjacent the protruding portion 56. The annular groove 58 further contains an upper surface 60 and a lower surface 62. Also within the area of the annular groove 58 is a keyway 64. The keyway is straight and extends from the top 66 of the valve neck 50 to a distance below the lower surface 62 of annular groove 58. The valve neck 50 also contains a lower inwardly extending surface 72 which extends radially inward to form an internal ring on the lower surface and inward of the interior surface 54 of the valve neck 50. This lower internal surface or ring 72 contains an upper surface 74.

Figure 2:
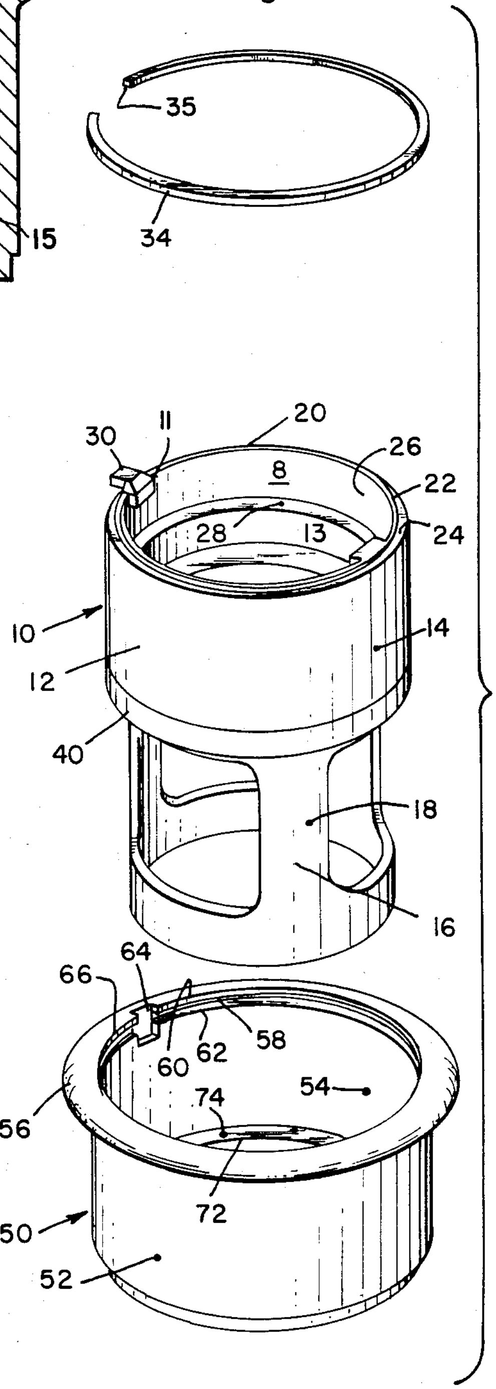

Also illustrated in FIG. 1 is the valve body 10. For the sake of completeness, the entire valve body and associated valves have been shown in FIG. 1, but for purposes of the present invention the relevant portions of the valve body 10 are illustrated in FIG. 2. The valve body 10 has an upper cylindrical portion 12 which contains an exterior surface 14. Located beneath the upper cylindrical portion 12 is a valve housing member 16 which contains an exterior surface 18. Located directly beneath the upper cylindrical portion 12 and surrounding the upper portion of the external wall 18 of valve housing member 16 is a seal 40. The top 20 of valve body 10 has an annular step 22 which consists of an annular shoulder 24 and an internal wall 26 on the top of the valve body 10. As illustrated in FIG. 2, the annular shoulder extends around the entire outer circumference of the top of the valve body being interrupted by only one or more keys. The internal wall 26 is adjacent the shoulder and extends around the entire circumference of the inner periphery of the annular shoulder 24. As illustrated in FIG. 2, the valve body is hollow and therefore the inner surface of the wall 26 can coincide with the inner wall 8 of the valve body 10. Also located on the valve body 10 at its top 20 and protruding radially outward from its exterior surface 14 is a key 30. In the embodiment shown in FIG. 2, there is only one key 30. As will be described later on, the alternative embodiment shown in FIG. 4 has two keys.

The last element of the present invention is a generally circular split retaining ring 34, as shown in FIG. 2. The opening of the ring is designated as 35.

Also shown in FIG. 1, though not directly relevant to the present invention, is a ball valve 100 and an associated spring 102. Also shown is a second valve member 104.

As shown in FIG. 2, the valve body 10 contains a pair of lugs 11 and 13, one of which, 11, extends inwardly from the key 30 and the other of which, 13, is approximately 180 degrees from it. These lugs are designed to accommodate a coupling device (not shown) which is inserted into the valve body 10 and rotated to be held securely in place by the lugs. This coupling device serves to open valves 100 and 104 to permit fluid under pressure such as beer to be dispensed from the container through the coupling device.

In order for the present invention to work properly, it is important that the seal 40 be sufficiently resilient to allow itself to be compressed to the point where the top of the internal wall 26 on the valve body 10 lies below the lower surface 62 of annular groove 58 of the valve neck 50 so that the retaining ring 34 can be inserted into groove 58 and then have sufficient memory to return to its working position so that the valve body 10 is forced upward to force the annular shoulder 24 against the retaining ring 34. Seals which incorporate these features are known in the prior art. One embodiment of a seal which will work with the present invention is shown in FIGS. 5 and 6. As shown in the top plan view of FIG. 5, the seal 40 is of generally circular configuration. As shown in the cross-sectional view of FIG. 6, the seal 40 is of corrugated design which contains a multiplicity of upper and lower peaks and valleys. In the preferred embodiment shown in FIG. 6, the upper surface contains three upper peaks 42 and two valleys 44 located between them. Similarly, the lower surface contains three lower peaks 46 and two valleys 48 located between them. When the seal is compressed through pressure, the two outermost peaks compress inwardly toward an adjacent valley and the central peak compresses toward one of the two adjacent valleys. Therefore, through this design, the seal can compress inwardly on itself and become smaller. When the pressure is released, the resiliency of the seal permits it to return to its normal shape.

The operation of one embodiment of the present invention will now be described. As previously mentioned, the valve neck 50 is welded to a container to thereby form an opening in the container. The seal 40 is placed on the valve body 10 such that it abuts the lower surface 15 of the upper cylindrical portion 12 of the valve body 10 and also surrounds the upper portion of the exterior surface 18 of the valve housing member 16. The valve body 10 is inserted into the valve neck 50 such that the key 30 in the valve body 10 is aligned with the keyway 64 in the valve neck 50. A special tool is then used to apply a downward force on the valve body 10 which forces the seal 40 to compress in the manner previously described. As shown in FIG. 1, this seal 40 abuts the upper surface 74 of lower surface 72 of the valve neck 50. The valve body 10 is pushed downward by a sufficient amount so that the top of the internal wall 26 on the valve body 10 lies below the lower surface 62 of annular groove 58 in valve neck 50. Then split retaining ring 34 is inserted into the valve neck 50 so that a portion of it enters the annular groove 58 within valve neck 50 and a portion of it protrudes radially inward. The opening 35 in the split retaining ring 34 is located at the area where key 30 is located. At that point, the pressure is released and the seal 40 is permitted to expand to its normal configuration. This expansion forces the valve body 10 upwardly until the annular shoulder 24 comes in contact with retaining ring 34. The retaining ring 34 is partially within annular groove 58 and partially rests on the top annular shoulder 24 of valve body 10 and abuts top interior wall 26 of the step 22 of valve body 10. As a result, the key 30 is now in the same plane as the split retaining ring 34, which in turn rests partially within annular groove 58 and partially on annular shoulder 24 at the top of valve body 10. There is now a tight fit at the location of the top of the valve body 10 and the retaining ring 34 since the retaining ring 34 rests firmly against the top annular shoulder 24 and also abuts internal annular top wall 26. It is therefore virtually impossible to stick a screwdriver or any other common tool into this retaining means to pry the retaining ring loose. The key 30 is at gap 35 of the retaining ring 34 and there is a tight fit all around. Only a specially adapted tool for removing the retaining ring 34 will work. It is important to note that it is not absolutely essential for the key 30 to be in the same plane and the retaining ring 34. The major function of the key 30 is to prevent rotation of the valve body 10 once it is inserted into the valve neck 50. Therefore, the key 30 could in fact be above or below the retaining ring 34 rather than in the same plane. However, it is preferred to have the key in the same plane so that it will be virtually impossible to stick an instrument such as a screwdriver into the gap location 35 of the retaining ring 34.

In prior art embodiments, the key 30 was in the lowermost portion of the recess and the retaining ring 34 rested above the top of the valve body 10. This arrangement permitted relatively easy removal of the retaining ring 34 with the attendant problems previously described.

While the present invention has been described in conjunction with a straight keyway 64, it is emphasized that the shape of the keyway is not important. The keyway 64 can be of any design such as straight or dog-legged. The only important concept for the present invention is that the design of the keyway be such that it will permit the valve body 10 to be lowered by a sufficient amount so that the top of the internal wall 26 lies below the annular groove 58 so that the retaining ring 34 can be inserted into the groove 58. It is also emphasized that the design of the seal as previously described is only one embodiment which will work with the present invention. Any seal design which has the properties of resilience and memory to permit compression to allow the valve body to be inserted as described and then sufficient memory to return to its original shape and force the valve body and its annular shoulder 24 against the retaining ring 34 is acceptable for purposes of utilization in conjunction with the present invention.

As shown in FIG. 2, an internal step 28 is located within valve body 10. One method by which the valve body 10 can be compressed into the valve neck 50 is by pressure from a special tool applied to this internal step 28. It is from pressure applied to this internal step 28 by the tool through which the valve body 10 can be depressed against the force of seal 40 to force the annular shoulder 24 to the desired lower position as previously described so that the retaining ring 34 can be inserted into groove 58. Pressure can also be applied at other locations within the valve body 50 to produce the same result.

As a result, the present invention provides a retaining apparatus for retaining the valve body 10 within the valve neck 50, which is virtually tamperproof. This is extremely important because the container is pressurized for dispensing a liquid such as beer. If the retaining apparatus could be tampered with, the retaining ring 34 could be removed and the pressure from within the container would force the valve body 10 to fly outwardly, thereby potentially seriously injuring someone.

The alternative embodiment shown in FIGS. 3 and 4 utilizes two keys 31 and 33 on the valve body 10 instead of the single key 30 of the embodiment in FIG. 2. To accommodate them, the valve neck 50 now contains two keyways, 65 and 67. The keyways 65 and 67 are designed to correspond exactly with keys 31 and 33 respectively so that the valve body 10 may be inserted into the valve neck 50 such that the keys are aligned with the keyways. Finally, instead of the single split ring 34, there are two semicircular rings 37 and 39 which are used with the embodiment containing two keys 31 and 33 in the valve body 10.

In operation, this embodiment is very similar to the first embodiment. The valve body 10 is inserted into the valve neck 50 such that a respective key 31 and 33 is aligned with a respective keyway 65 and 67 in the valve neck 50. As before, a special tool is then used to apply a downward force on the valve body 10 which forces the seal 40 to compress in the manner previously described. As shown in FIG. 3, this seal 40 abuts the upper surface 74 of lower ring member 72 of the valve neck 50. The valve body 10 is pushed downward by a sufficient amount so that the top of the internal wall 26 lies just below annular groove 58. The depth of the keyways is sufficient to permit the keys to be lowered by a sufficient amount into the keyways to permit this to take place. Then split retaining rings 37 and 39 are inserted into the valve neck 50 so that a portion of each ring enters the annular groove 58 within valve neck 50 and a portion of each retaining ring protrudes radially inward of interior valve neck wall 54. As shown in FIG. 4, each retaining ring 37 and 39 is semi-circular in configuration and is sized so that the ends of each retaining ring is close to an adjacent end of a keyway 65 or 67. Therefore, there is a gap between the retaining rings 37 and 39 which is slightly larger than the width of a key 31 and 33. The pressure is now released and the seal 40 is permitted to expand to its normal configuration. This expansion forces the valve body upwardly until the annular shelf 24 on the valve body 10 comes into contact with a respective retaining ring 37 or 39. Each retaining ring, 37 and 39, is partially within annular groove 58 and partially rests on the top annular surface 24 of valve body 10 and abuts top interior wall 26 of the step 22 of the valve body 10. Each key, 31 and 33, fits within the gap between the retaining rings 37 and 39. As a result, the keys 31 and 33 are in the same plane as the retaining rings 37 and 39. It is therefore virtually impossible to stick a screwdriver or any other common tool into this retaining means to pry the retaining rings loose. As before, only the specially adapted tool for removing the retaining rings 37 and 39 will work.

As before, the fit between the retaining rings 37 and 39 and annular shoulder 24 is sufficiently tight so that it is not essential that the keys 31 and 33 be in the same plane as the retaining rings. The major function of keys 31 and 33 is to prevent rotation of valve body 10 within valve neck 50. However, in the preferred embodiment it is desirable to have the keys 31 and 33 in the same plane as retaining rings 37 and 39 so that it is virtually impossible to insert a screwdriver or other tool at the location of the gap between the retaining rings to try and remove the retaining rings. Each retaining ring 37 and 39 also abuts interior wall 26 with sufficient force to also lend to the strength of the retaining means.

As should be apparent from the above description, the outer diameter of the retaining ring is approximately equal to the outer diameter of the annular groove in the valve neck. In the case of the pair of semi-circular retaining rings, their combined outer diameter when they form a circle is approximately equal to the outer diameter of the annular groove. The width of the retaining ring or each of the pair of semi-circular retaining rings is approximately equal to the combined widths of the annular groove in the valve neck and the annular top shoulder in the valve body.

While only embodiments with one or two keys and corresponding keyways have been described, the present invention also encompasses any multiplicity of keys and associated keyways. For example, three keys spaced 120 degrees apart and associated keyways therefor, or four keys spaced 90 degrees apart and associated keyways therefor are certainly within the spirit and scope of the present invention. In each additional embodiment, the appropriate number and shape of partial retaining rings would be used.

For illustrative purposes only, one set of detailed dimensions will be set forth. It is emphasized that this set of dimensions is designed to show only one of numerous dimensional configurations for the present invention and is in no way intended to limit the scope of the claimed monopoly. The annular groove 58 may have a depth of 0.060 inches and the annular shelf or shoulder 24 may have a width of 0.040 inches. The inner diameter of the annular groove 58 and the interior surface 54 of valve neck 50 can be 2.003 inches while the outer diameter of the valve body 10 and therefore the annular shoulder 24 can be 1.98 inches. Therefore, there is a very slight gap of 0.0023 inches between the parts. Therefore, the width of the retaining ring 34 or the two retainings rings 37 and 39 as the case may be can be 0.101 inches. Both the annular groove 58 and the retaining ring 34 can have an outer diameter of the same dimension. Therefore, the retaining ring 34 or two rings 37 and 39 can fit within annular groove by an approximate distance of 0.060 inches and can extend radially inward of said groove by a distance of approximately 0.041 inches, to thereby rest on almost the entire width of 0.040 inches of the annular shoulder 24. The gap of 0.0023 inches provides sufficient clearance for the extra width of 0.001 inches of the retaining ring. The retaining ring 34 or rings 37 and 39 preferably abut top inner wall 26. The height of the annular groove 58, the ring or rings 34, or 37 and 39 and the top wall 26 can all be approximately the same and by way of example can be 0.062 inches.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. An apparatus for retaining a valve body in engagement with the valve neck of a container, wherein the valve neck is of generally hollow cylindrical configuration including a top surface and an inner surface with an annular groove extending around the entire inner surface at a location adjacent the top of the valve neck and a keyway within said inner surface and extending from the top of the valve neck through the annular groove and to a distance below the annular groove and further characterized by a lower annular shelf protruding radially inward of the bottom of the valve neck, and wherein the valve body is of generally cylindrical configuration and is characterized by an upper cylindrical portion which contains an exterior surface and a key located adjacent its top and extending radially outward of its exterior surface and further containing a flexible seal adjacent its bottom, wherein the apparatus for retaining the valve body in engagement with the valve neck comprises:

a. said upper cylindrical portion of said valve body containing an annular step on its top surface which defines an annular top shoulder extending around the outer circumference of the top and an internal wall adjacent the annular top shoulder and extending around the entire circumference of the inner periphery of the annular top shoulder;

b. a split retaining ring whose opening is approximately equal to the width of said key on said valve body;

c. the diameter of said split retaining ring being approximately equal to the outer diameter of said annular groove in said valve neck;

d. the width of said split retaining ring being approximately equal to the combined widths of said annular groove and said annular top shoulder; and e. said split retaining ring being accommodated within said annular groove such that a portion of the split retaining ring lies within the annular groove and a portion of the split retaining ring extends radially inward of the internal valve neck surface for a distance approximately equal to the width of the annular top shoulder of the valve body and the ends of the retaining ring abutting said key;

f. wherein when said valve body is inserted into said valve neck such that said key on said valve body is aligned with said keyway of said valve neck and said flexible seal rests against said lower annular shelf on said valve neck, pressure on said valve body depresses said valve body into said valve neck by a distance sufficient to enbable the top of the internal wall in said valve body to lie below said annular groove in said valve neck, at which time said retaining ring can be inserted into said annular groove such that the gap in said retaining ring is aligned with said keyway, and when the pressure on the valve body is removed said flexible seal forces said valve body upwardly until the annular top shoulder on said valve body comes into contact with said retaining such that the retaining ring lies on said top annular shoulder to said valve body and abuts said internal wall of the valve body, such that the annular ring surrounds and abut the key on said valve body and is in the same plane as the key on the valve body to prevent any tampering and removal of the retaining ring.

2. An apparatus for retaining a valve body in engagement with the valve neck of a container, wherein the valve neck is of generally hollow cylindrical configuration including a top surface and an inner surface with an annular groove extending around the entire inner surface at a location adjacent the top of the valve neck and a pair of oppositedly disposed keyways within said inner surface and extending from the top of the valve neck through the annular groove and to a distance below the annular groove and further characterized by a lower annular shelf protruding radially inward of the bottom of the valve neck, and wherein the valve body is of generally cylindrical configuration and is characterized by an upper cylindrical portion which contains an exterior surface and a pair of oppositedly disposed keys located adjacent its top and extending radially outward of its exterior surface and further containing a flexible seal adjacent its bottom, wherein the apparatus for retaining the valve body in engagement with the valve neck comprises:

a. said upper cylindrical portion of said valve body containing an annular step on its top surface which defines an annular top shoulder extending around the outer circumference of the top and an internal wall adjacent the annular top shoulder and extending around the entire circumference of the inner periphery of the annular top shoulder;

b. a pair of semi-circular retaining rings which form a circle containing gaps between the ring which gaps are approximately equal to the width of each of said keys on said valve body;

c. the combined diameter of said split retaining rings being approximately equal to the outer diameter of said annular groove in said valve neck;

d. the width of each of said retaining rings being approximately equal to the combined widths of said annular groove and said annular top shoulder; and e. each of said split retaining ring being accommodated within said annular groove such that a portion of the split retaining ring lies within the annular groove and a portion of the split retaining ring extends radially inward of the internal valve neck surface for a distance approximately equal to the width of the annular top shoulder of the valve body and the ends of each of the split retaining rings abutting one side of each keyway;

f. wherein when said valve body is inserted into said valve neck such that each of said keys on said valve body is aligned with said keyways of said valve neck and said flexible seal rests against said lower annular shelf on said valve neck, pressure on said valve body depresses said valve body into said valve neck by a distance sufficient to enable the top of the internal wall in said valve body to lie below said annular groove in said valve neck, at which time said retaining rings can be inserted into said annular groove such that the gap between said retaining rings is aligned with each of said keyways, and when the pressure on the valve body is removed said flexible seal forces said valve body upwardly until the annular top shoulder on said valve body comes into contact with said retaining rings such that the retaining rings lie on said top annular shoulder of said valve body and abut said internal wall of the valve body, such that the annular rings surround and abut the keys on said valve body and are in the same plane as the keys on the valve body to prevent any tampering and removal of either of the split retaining rings.

* * * * *